March 2, 1971  J. N. NUZUM  3,567,248
TRAILER WITH MULTIPOSITION FENDERS
Filed April 30, 1969
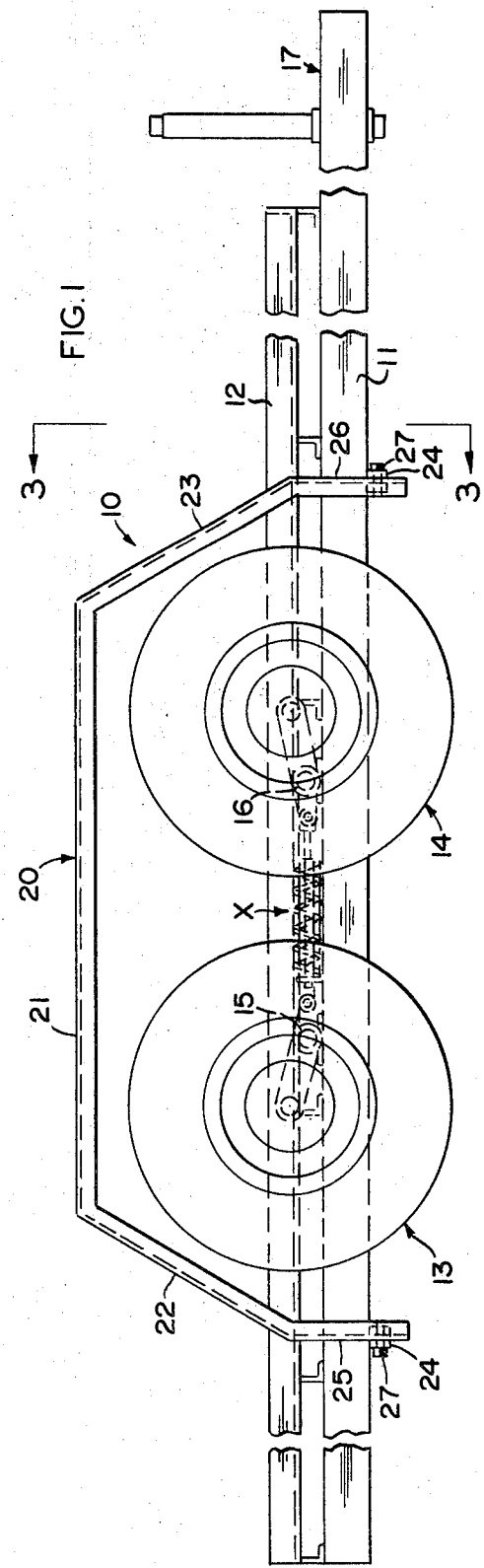
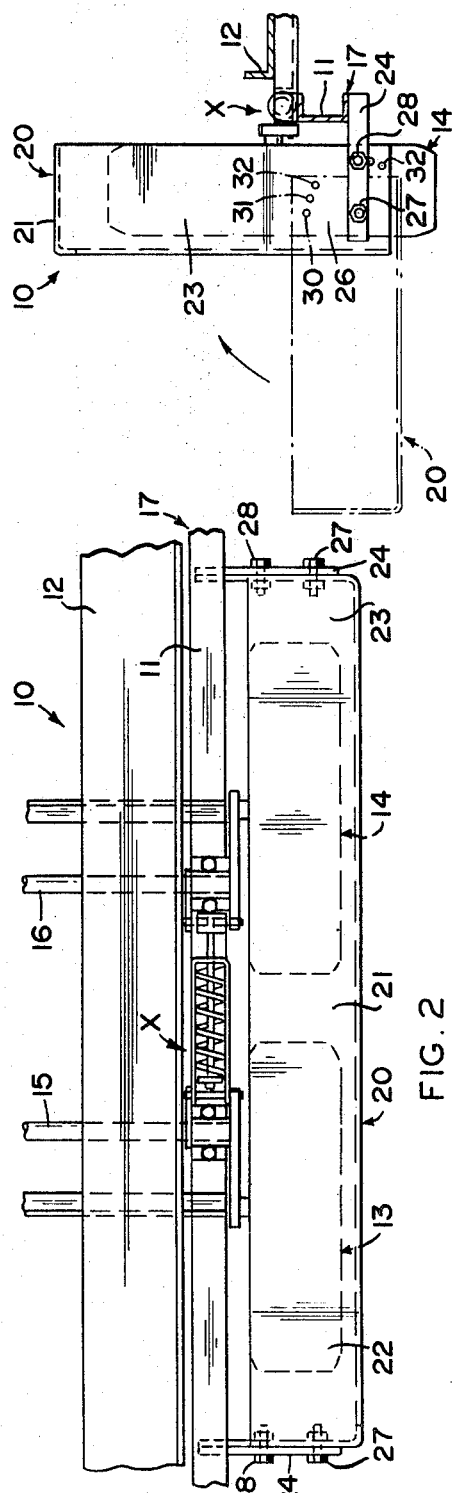
INVENTOR.
JOHN N. NUZUM
BY
Oldham & Oldham
ATTORNEYS.

ered Mar. 2, 1971

United States Patent Office 3,567,248
Patented Mar. 2, 1971

3,567,248
TRAILER WITH MULTIPOSITION FENDERS
John N. Nuzum, Barberton, Ohio, assignor to Travel-Safe Trailer Mfg., Inc., Akron, Ohio
Filed Apr. 30, 1969, Ser. No. 820,526
Int. Cl. B62d 25/16
U.S. Cl. 280—154                                                    3 Claims

ABSTRACT OF THE DISCLOSURE

The trailer includes a frame having longitudinally extending side members thereon, support wheels operatively attached to the frame and positioned laterally beyond the frame, and individual fender means provided for each of the support wheels in the trailer. These fenders are carried operatively by the trailer frame and are adapted to be positioned operatively above the support wheels for the trailer and to be swung laterally outwardly to inoperative position to facilitate loading and unloading of the trailer.

---

The present invention relates to vehicle trailers, and particularly to improved fender means having inoperative positions out of direct association with the support wheels of the trailer.

Heretofore there have been many different types of trailers provided for carrying automobiles, boats, or other objects thereon, and these trailers have been provided in a multitude of different designs.

The present invention relates to trailers for carrying heavy loads thereon and where it is particularly desirable that the trailer have a low over-off height and where the trailers include one or more support wheel assemblies at each side thereof that protrude laterally from the remainder of the trailer frame and are operatively attached thereto.

The general object of the present invention is to provide a novel and improved fender assembly for trailers, and especially to provide multiposition fender assemblies for use with low-height trailer units.

Another object of the invention is to attach fender means to trailers in such a manner that the fenders can be swung out of operative association with support wheels for the trailer to facilitate trailer loading and unloading actions and to provide increased accessibility to the trailer and loads thereon when desired.

A further object of the invention is to provide improved, sturdy, fender assemblies for use with trailers wherein the fenders can readily be moved to and from operative and inoperative positions with the operative position being directly above a support wheel or wheels and, when inoperative, the fender being inclined laterally outwardly and/or downwardly of the trailer assembly.

Another object of the invention is to provide an improved fender installation on a flat-bed trailer to provide more room for loading cars onto the trailer and, after completion of the car loading onto the trailer, to allow all possible room on the top of the trailer tires for the driver to open the cars doors for an easy exit from the car as positioned on the trailer.

The present invention, as one embodiment thereof, comprises a trailer frame having longitudinally extending side members thereon and a pair of support wheel means operatively attached to the frame and positioned laterally beyond the frame but having portions extending above the frame, and the invention relates to the improvement comprising a fender means for covering each of the support wheel means, and support members attached to the frame side members and extending laterally therefrom immediately adjacent fore and aft portions of the support wheels, and means to attach the fender means pivotally to the support means for movement to and from an operative position directly over the support wheel means.

Reference is now particularly made to the accompanying drawings, wherein:

FIG. 1 is a fragmentary side view of a trailer having a fender assembly embodying the principles of the invention operatively secured thereto;

FIG. 2 is a fragmentary plan of one side portion of the trailer and fender assembly of FIG. 1; and FIG. 3 is a fragmentary vertical section taken on line 3—3 of FIG. 1 with an inoperative position of the trailer fender means being indicated.

When referring to corresponding members shown in the drawings and referred to in the specification, corresponding numerals are used to facilitate comparison therebetween.

Attention now is particularly directed to the details of the structure shown in the drawings, and a flat bed trailer is indicated as a whole by the numeral 10. This trailer is adapted to be attached to any prime mover vehicle by conventional means (not shown). The trailer 10 includes a frame 17 having a pair of longitudinally extending channels or side members 11 only one of which is shown, as the novel fender means of the invention and attachment thereof to the trailer is the same on both sides of the center line of the trailer. Any suitable support members for load to be applied to the trailer are usually provided thereon and may include a plate or angle member 12 which is shown operatively attached to the longitudinally extending frame side channel or beam 11.

The trailer 10 has at least a pair of support wheel means operatively attached to opposed lateral portions of the trailer frame and in this instance, a pair of tire and wheel assemblies 13 and 14 are shown forming support wheel means for one side of the trailer 10. However, any number of support wheels may be used to provide a support wheel means for one side of the trailer 10 so that one, two or more of such tire and wheel assemblies may be operatively attached to the trailer frame by conventional means on each side thereof. One of such support wheel assemblies, indicated generally at X, may comprise a patented "Low-Walker" type of support wheel, tie rod, cross axle assembly as generally shown in U.S. Patent No. 3,071,391 wherein transversely extending support axles 15 and 16 are positioned at or below the center axis of the tire and wheel assemblies 13 and 14 and above the side members 11 to aid in providing a trailer 10 which has a low overall height. This facilitates use of the trailer 10 when relatively high loads are placed thereon and provides a low center of gravity in the trailer.

As an important element of the present invention, a fender means indicated as a whole by the numeral 20 is provided on each side of the trailer 10 to cover the support wheel means operatively attached to such side of the trailer 10. In this instance, the fender means 20 preferably is formed from any suitable material, such as metal, plastics, fiber reenforced plastic materials or other substances and wherein the fender means 20 may be made from a member which is of channel shaped in section and with the fender means 20 being adapted to follow closely the upper peripheral portions of the tire and wheel assemblies 13 and 14. Thus the fender means has a top portion 21 terminating in two downwardly and longitudinally inclined end portions 22 and 23. These end portions 22 and 23 terminate adjacent the front and rear portions of the tire and wheel assemblies 13 and 14 as operatively attached to the trailer frame 17. Each of the fender means 20, in the end portions 22 and 23 thereof, preferably have vertically extending attaching sections 25 and 26, respectively.

So as to position the fenders, support means pivotally secure the same to the trailer frame, and the trailer frame side members 11 are provided, for example, with support means, such as laterally outwardly extending bars or angles 24. The inner ends of each of these bars or angles 24 is suitably attached, as by welding, to the adjacent side member 11 and extends laterally therefrom, as shown in FIG. 3.

The drawings clearly show that the tire and wheel assemblies 13 and 14 are positioned laterally outwardly of the trailer frame 17 but with portions of the tire and wheel assemblies extending vertically an appreciable distance above the frame 17 of the trailer. Naturally it is desired that the tire and wheel assemblies be prevented from throwing a lot of dirt, moisture, etc. on the automobiles or other articles carried on the trailer 10 whereby it is very desirable to provide fenders covering these tires and wheel assemblies in the trailers.

The individual fender means 20 are pivotally secured to the fender support means, such as the bars 24, by conventional members, such as bolts or rivets 27 adjacent the laterally outer portion of the fender means at each end thereof.

The fender means 20 are operatively attached to the trailer 10 to be positioned vertically over and substantially covering the individual tire and wheel assemblies 13 and 14 by removable members, such as a pin or bolt means 28. These bolts or pins 28 engage a hole provided in each of the bars 24 laterally inwardly of the bolts 27 and which engage a hole 30 provided in a laterally inner in portion at each end of the fender means 20. Naturally any desired type of lock washers or other retaining means, cotter pins or the like can be used in association with the pins or bolts 27 and 28 to retain them in operative engagement with the fender means and other parts of the apparatus of the invention so that a fixedly established operative position is provided for the fender means 20.

Thus it is seen that the individual pins or bolts 28 can be removed from each end of the fender means 20 and then it can be swung down to the operative position as indicated in FIG. 3 wherein the fender means extends laterally outwardly and/or downwardly of the trailer and exposes the upper portions of the tire and wheel assemblies 13 and 14 for maximum accessibility to any article, such as an automobile positioned on the trailer 10. When an automobile is positioned on the trailer 10, due to the low heighth of the trailer frame and the wheel assemblies protruding above the frame, it has been difficult to open the car doors for the driver to get out but by the present invention access to the car is greatly improved. When the article is fully loaded onto the trailer, then the fenders are swung up into the vertical position shown in FIG. 3 and the bolts or pins 28 are operatively engaged with the fender. In some instances it may be desirable to position the fender means 20 to diverge laterally outwardly of the trailer 10 to again provide maximum load carrying space and availability in the load carrying zone provided on the flat bed trailer 10. Thus, a series of other holes indicated at 31 and 32 in the drawings and centered on the hole in the bar 24 for the bolt 28 may be formed in the vertical sections 25 and 26 at the ends of the fenders. Hence, these fenders can be retained in outwardly diverging positions when the trailer is in use, if desired, or just be swung outwardly and/or downwardly when loading or unloading the trailer.

Obviously the fender means of the invention may be of any suitable design or shape and they are positioned by sturdy members that can readily be used to position the fenders operatively on the trailers or to permit them to be swung out to inoperative positions very conveniently when desired. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In a trailer for a vehicle, a trailer frame including a pair of longitudinally extending side members, at least a pair of support wheel means operatively attached to opposed side portions of said frame and positioned laterally beyond said frame and having portions extending thereabove, the improvement comprising a fender means for covering each of said support wheels, a support means attached to each of said frame side members and extending laterally therefrom in front of and behind each of said support wheel means on each side of said frame, and means pivotally securing each of said fender means individually and operatively to said support means for movement from an operative position over said wheel means to an inoperative position laterally outwardly of said wheel means.

2. A trailer as in claim 1, where each of said support wheel means comprises a plurality of separate wheels operatively attached to longitudinally spaced portions of said frame, and each said fender means covers as a unit such plurality of wheels on each side of said trailer.

3. A trailer as in claim 1, where means are provided to secure said fender means directly over said wheel means and in alternate laterally outwardly inclined positions in relation thereto.

References Cited

UNITED STATES PATENTS

| | | | |
|---|---|---|---|
| 1,289,594 | 12/1918 | Allen | 280—154 |
| 2,914,341 | 11/1959 | Martt | 293—58 |

FOREIGN PATENTS

| | | | |
|---|---|---|---|
| 680,364 | 1/1930 | France | 280—160 |

LEO FRIAGLIA, Primary Examiner

R. R. SONG, Assistant Examiner